Nov. 6, 1934.  R. L. SESSIONS  1,979,287
METHOD OF CHLORIDIZING ORE MATERIALS
Filed June 14, 1933
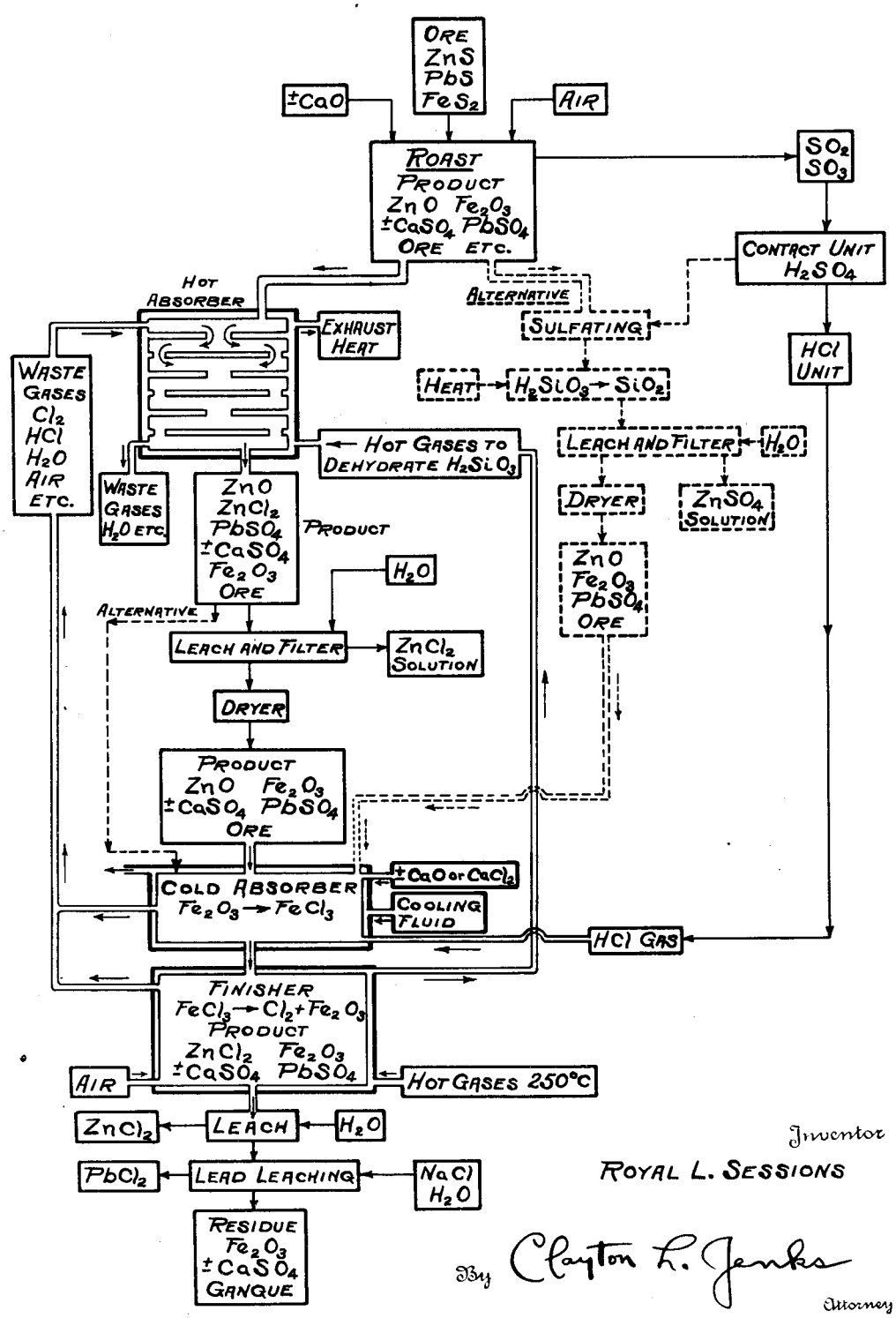
Inventor
ROYAL L. SESSIONS
By Clayton L. Jenks
Attorney Patented Nov. 6, 1934

1,979,287

UNITED STATES PATENT OFFICE 1,979,287

METHOD OF CHLORIDIZING ORE MATERIALS

Royal L. Sessions, Denver, Colo., assignor, by mesne assignments, to Hughes-Mitchell Processes, Incorporated, Denver, Colo., a corporation of Wyoming Application June 14, 1933, Serial No. 675,796

21 Claims. (Cl. 75—67)

This invention relates to a method of treating ores, and more particularly those ores which contain acid-soluble metal silicates capable of forming silicic acid during the process, and which permits the recovery of desired ore metal salts by simple and economical hydrometallurgical methods.

Theoretically, a sulfide ore, and particularly one containing zinc and manganese, may be readily treated by roasting to form an oxide and then converting the oxide to a soluble salt by means of an acid. However, such ores commonly contain simple or complex acid-soluble silicates containing potassium, sodium, aluminium, calcium and other elements combined with the silicate radical. These silicates are attacked by hydrochloric and sulfuric acids, whether gaseous or in the liquid condition, with the resultant formation of silicic acid. This material is a gelatinous, viscous substance which materially hinders the penetration of reagent gases and solutions into the ore material. Also, when an attempt is made to filter the ore metal salt solution from the residue, this silicic acid clogs the pores of the ore material or of the filter and hinders the passage of the solution therethrough.

Experience has shown that the direct application of dilute hydrochloric or sulfuric acid to a roasted zinc sulfide ore containing a large amount of these acid-soluble silicates may result in a zinc chloride or sulfate solution so heavy with silicic acid that the solution will become thick when boiled. If only 80% of the hydrochloric acid necessary to produce a slight acidity is employed, although no curdling of the zinc chloride solution will take place on boiling, yet subsequent purification of the solution, as by the addition of bleaching powder, will result in a very gelatinous precipitate. During the application of this 80% of acid, considerable sliming takes place, however, and so handicaps the filtration of the solution from the ore material.

One method of treating a zinc sulfide ore, and particularly an ore containing a high percentage of zinc-bearing materials, involves roasting the ore and then subsequently converting the zinc oxide by suitable reagents, such as hydrochloric acid gas, to zinc chloride and later treating the ore with chlorine to chloridize the refractory or difficultly treated compounds, such as the residual sulfides, ferrates, ferrites, silicates etc. of zinc and other ore metals which may be present in the ore. It has been found in practice that such a process which will work satisfactorily on a low grade zinc ore will not extract anywhere near 100% of the zinc of a high grade ore. This is due to various causes, one of which is the presence of silicic acid, as above discussed. Another lies in the fact that the reaction of hydrochloric acid on zinc oxide results in the formation of a molecule of water which dissolves the highly deliquescent zinc chloride and forms a syrupy or viscous mass which coats the surfaces and the pores of the ore particles and causes the material to ball up when agitated into a sticky mass which materially hinders access of the chloridizing gaseous reagent into the particle for reaction with the ore metal values. One satisfactory method for treating a zinc concentrate involves removing a large proportion of the zinc oxide from the roasted ore prior to the chloridization of the refractory constituents of the ore. For this purpose, a leaching operation is indicated, but any treatment of this roasted ore with hydrochloric acid or sulfuric acid results in the formation of the deleterious silicic acid.

Because of such difficulties, it has heretofore been deemed necessary to concentrate certain types of ore material in order to remove the major portion of the gangue containing the acid-soluble metal silicates. Concentrating a zinc ore has, however, made chloridization of the material by a gaseous reagent difficult. A selective flotation process has also been employed in connection with a complex ore, such as a lead-zinc ore, which serves to separate a considerable proportion of the lead from the zinc bearing materials, so that each portion of the ore may be treated separately in a subsequent simple treatment. It is desirable, on the other hand, to provide a method for treating a complex ore which makes is unnecessary either to concentrate the ore material for removing silica and silicates or to selectively separate one ore material from another. A complex ore should be treated by a sequence of steps which recovers first one ore value and then another, and these steps should be simple, economical, orderly and efficient.

The primary object of this invention is to overcome these difficulties and to provide a simple and efficacious method of solubilizing the values of a complex or simple ore, containing zinc, manganese or other recoverable compounds intermingled with an acid-soluble metal silicate, by means of a gaseous acid reagent, and so carrying on the process that any silicic acid thus formed will not be permitted to hinder the solubilizing step or any subsequent leaching or filtering operation, and particularly to provide a method of efficiently chloridizing both the oxides and the refractory portions of a roasted sulfide ore of this type.

A further object of this invention is to provide a method of chloridizing an ore which is high in zinc, as well as acid-soluble silicates, in accordance with which the excess of zinc is removed from the ore material and the silicates are rendered harmless prior to the final chloridizing step, after which the material is treated as a low grade ore under conditions which result in an effective chloridization of the residual and refractory ore metal compounds therein.

With these and other objects in view, as will be apparent in the following disclosure, this invention resides in the combination of steps set forth in the specification and covered by the claims appended hereto.

In accordance with one aspect of this invention, an ore material, and particularly a roasted sulfide ore, such as one containing zinc or manganese oxides, which carries an acid-soluble metal silicate, is solubilized by an acid reagent, such as hydrochloric or sulfuric acid, and particularly by a gaseous reagent which is capable of forming the desired ore metal salt and silicic acid; and the process is so carried on as to dehydrate the silicic acid thus formed and prevent its appearance as a gelatinous mass in any subsequent leaching or filtering operation or in the resultant product. This is accomplished by heating the ore material after a preliminary treatment with the acid reagent to a temperature at which the silicic acid is dehydrated and converted into silica, thus maintaining the ore material in a granular, gas-permeable condition capable of being efficiently treated by a subsequent chloridizing step. The invention is particularly applicable to the chloridization of a complex or a refractory sulfide ore by a series of steps involving roasting the ore, solubilizing a part or all of the oxides by an acid and thereafter treating the residue with chlorine, either introduced for the purpose or formed in the nascent condition in the presence of the ore material. Such an ore may be preliminarily prepared, according to this invention, so that it may be economically and effectively treated in a subsequent chloridization. The initial conversion to a soluble sulfate or chloride of a portion or all of a desired metal oxide of the ore, and particularly if the solubilized material is removed by a leaching operation, serves to open up the ore particle and prepare it for penetration by a gaseous chloridizing agent, and especially for a process which is effective on a low grade ore. An ore which is high in zinc, as well as the acid-soluble silicates, may have the excess of zinc over that which may be effectively chloridized in the final stages initially converted to a soluble salt and removed from the ore material, so that no large amount of deliquescent zinc chloride or silicic acid will be present during the final chloridizing stages, which are thus rendered more efficient.

In order that the invention in its entirety may be fully understood, reference is to be had to the accompanying drawing which shows diagrammatically the sequence of steps involved in a complete process incorporating all of the features of this invention, as required for treating a complex rich ore containing the sulfides of zinc, lead and iron. It is to be understood, however, that this drawing is merely illustrative of the general principles of the invention, and that various subcombinations of the steps herein described may be employed within the scope of my invention for treating various ore materials.

The primary steps of the process involve roasting the ore material, with or without the addition of an alkaline earth metal oxide, to make the ore pulverulent and gas-permeable as well as to fix any available sulfate radical. This roasting operation is preferably carried on with sufficient air and at as low a temperature as is feasible for burning the ore autogenously or to prevent sintering or fusion of the mass; and a considerable amount of residual sulfide sulfur, such as 5% or more, may be left in the ore material without detrimentally affecting the subsequent reactions which are so carried on as to take care of this residual sulfur. If the ore is high in gangue, which tends to fuse or sinter during the roasting operation, or if it is desired to fix the available sulfate radical and prevent the formation of sulfates during the roasting operation, then 5% or more of alkaline earth metal oxide, hydroxide or carbonate, such as lime, may be incorporated in a finely divided condition with the pulverized ore material. A low temperature autogenous roasting operation with excess of air will, therefore, result in the production of zinc oxide, ferric oxide, calcium sulfate, lead sulfate and the oxides or sulfates of other ore materials. Any metal, such as zinc or copper, which tends to roast to either the oxide or the sulfate form, will be prevented from forming the sulfate because of the preferential combination of the alkaline earth metal with the sulfate radical. If, on the other hand, the ore may be roasted readily to a non-sintered condition, and particularly where it contains a high content of iron sulfide and a low content of siliceous material that tends to vitrify, then the alkaline earth material may be omitted, thus resulting in the formation of both oxides and sulfates of zinc and other metals. Various expedients may be adopted to maintain the ore material in a granular or pulverulent condition, and particularly one which may be easily penetrated by the gaseous reagents. The roasted product, if lime has been used, is a pulverulent or granular, gas-permeable material containing zinc oxide, ferric oxide, lead sulfate, calcium sulfate and other materials. Without lime, zinc sulfate may also be present.

The process is particularly adapted for a high grade zinc ore containing silicates, and especially the complex ores containing lead and other metals, and where it is desired or feasible to remove a portion of the zinc oxide before chloridization. Leaching directly with an acid for this purpose is not efficient because of the silicic acid formed; hence, the preferred method is to accomplish this result in a two-stage process in which the zinc oxide is first converted by a gaseous reagent, such as sulfur trioxide or hydrochloric acid gas, to the desired salt while in a granular, substantially dry condition, and the silicic acid is dehydrated, after which the zinc salt is dissolved by water and thus easily removed from the ore. The oxides may also be treated in a substantially dry condition by the application to the ore of a small amount of sulfuric acid or hydrochloric acid of suitable strength which reacts directly with the zinc oxide to form zinc sulfate or chloride as well as the acid-soluble silicates. Between the two steps of forming the salt and removing it from the ore, the silicic acid formed by the acid is dehydrated by a heat treatment as herein described, but this dehydration step must precede the leaching operation. The material is thereafter dried for the subsequent chloridizing treatment. The drawing illustrates, as an alternative procedure, the recovery of zinc as a sulfate, prior to the main chloridizing operations.

The preferred method of treating a roasted high grade complex zinc and lead sulfide ore so as to recover the zinc wholly as a chloride involves the preliminary operation of removing the excess of the zinc oxide over that which permits the ore to be chloridized by a process which is efficient on a low grade ore. This may involve converting the zinc oxide to a chloride by means of hydrochloric acid gas, and particularly the waste gases from later stages of the process, under such conditions that the ore material remains granular in character and substantially dry to the touch, so that closure of the pore spaces between and within the granules is prevented. After a sufficient amount of oxide has been thus solubilized, the silicic acid is dehydrated and the ore metal chloride is dissolved in water by a leaching operation. If the ore is low in the desired ore metal, then this leaching step may be omitted, although the dehydration of the silicic acid is required.

As indicated on the drawing, the chloridization of a lead, zinc and iron sulfide ore may be carried on in three primary stages, first in a hot absorber, where some chloridization is effected and the silicic acid is dehydrated, then in a cold absorber where iron chloride is produced and finally in a finisher where the iron chloride is used as a source of nascent chlorine and is converted to the insoluble ferric oxide.

The absorbers and the finisher may each be an apparatus of the form of a long rotary tube having baffles on its inner surface, or an apparatus having a vertical series of shelves and side walls forming communicating reaction chambers, in which revolving rake arms are employed to move the material successively from one shelf to the next below it as the material is being treated by a concurrent or countercurrent flow of a suitable gaseous reagent. The drawing indicates diagrammatically that the hot absorber is of the latter type.

In the first or hot absorber, the waste gases from the finisher and the cold absorber, or any other chloridizing apparatus employed in the process, may be utilized to convert zinc and other ore metal oxides to soluble chlorides. The gases may pass in a concurrent or countercurrent flow relative to the ore material, but are preferably introduced into the upper portion of the apparatus and removed from the lower hotter zone. Since iron oxide is ordinarily present in such ores, and if it is desirable to recover a zinc salt free from iron, then the ore is so roasted as to convert the iron oxide to the ferric condition, and the chloridizing step in this hot absorber is so controlled as to leave a considerable amount, such as 20%, of zinc oxide present in intimate association with the iron oxide to prevent the latter from being chloridized.

A primary feature of this invention involves so treating this ore material that when it leaves the hot absorber, and prior to the leaching operation, any silicic acid which has been formed by reaction of the acids with the acid-soluble silicates will have been dehydrated. Therefore, the lower end of the hot absorber is heated to such a temperature as will serve to dehydrate or decompose the silicic acid and leave it in the form of insoluble particles of silica. This dehydration may be accomplished in a separate apparatus, if desired, and for this purpose a gas flame or other source of heat may be employed. It is preferred to pass the hot gas derived from the finisher, which is preferably maintained at a temperature between 250° and 350° C., into the lower end of the hot absorber, subject to a suitable control of the temperature of the gas when it enters the absorber walls as well as in its passage through the apparatus. The absorber is preferably provided with hollow walls for both the shelves and the outer casing, within which jacket the hot gas passes in a countercurrent relationship to the ore flow, so as to heat the ore material gradually as it flows downward. A concurrent flow of reagent gases and a countercurrent flow of heating gas will serve efficiently for treating a roasted ore which is cold when introduced to the absorber, but the gas flow may be otherwise, if desired. As shown in the drawing, the moisture-laden gases from the finisher and cold absorber, which contain air, water, chlorine and hydrochloric acid gas, meet the ore material where introduced from the roaster. The chlorine and hydrochloric acid are extracted from the gases, while the water vapor and excess of air pass out without wetting the ore material. The material is suitably agitated, as by means of rakes or other stirring apparatus, and thus is thoroughly exposed to the action of the dehydrating heat, as well as the reagent gases within the chloridizing zone.

The temperature of the dehydration process will be controlled in accordance with the nature of the ore material. A range of temperatures from 80° to 365° C. at the exit end of the absorber has been found suitable for this purpose, depending upon the ore material selected. Inspection or analysis of the product will readily determine whether or not this dehydration has been accomplished, and the heat will be regulated accordingly. The temperature should be below that at which the zinc chloride or other desired value volatilizes or decomposes or forms an oxychloride or other objectionable compound.

In the hot absorber, there are other temperature requirements. Since the reaction of zinc oxide and hydrochloric acid produces water, the heat in the upper cooler zone preceding the dehydration of the silicic acid should be maintained at a temperature in the vicinity of 100° C., and preferably between 80° and 110° C., at which, having regard to the rate of flow of the gases through the chamber, sufficient water will be removed as vapor to insure that the ore remains in a granular, substantially dry condition, so that the deliquescent zinc chloride cannot dissolve to such an extent in the water of reaction as to form a viscous, syrupy mass which materially hinders penetration of the reagent gases to the ore particles. Also, the conversion of ferric oxide to ferric chloride is hindered or prevented in the hot absorber, since the temperature is ordinarily above that at which the iron chlorides are stable in the presence of the excess of air coming from the finisher. This results in an orderly chloridization of the zinc oxide, which may be recovered as zinc chloride free from iron as well as silicic acid, and then the conversion of iron oxide to the chloride for use in chloridizing the residual sulfides and other refractory compounds.

The invention applies to the solubilizing of various ore materials by means of a gaseous reagent, producing or acting in the presence of water, which is capable of forming the desired salt and of converting some of the ore metal silicates to silicic acid, provided this solubilizing step is carried on at or is followed by the operation of heating the ore material to a temperature at which the silicic acid is decomposed or converted to the insoluble silica. For example, an ore material containing manganese dioxide, with or without zinc oxide or other ore metal compounds, may be similarly treated in the hot absorber with a gaseous reagent acting in the presence of water to form a soluble ore metal salt. Hydrochloric acid will form the soluble manganese chloride, together with nascent chlorine, which will attack the residual sulfides. The salts may be dissolved from the residue after the silicic acid has been rendered insoluble.

The leaching operation is simple and may be conducted by placing the ore material in a pachucha or other suitable apparatus and passing water through the material. This water may be a dilute solution of zinc chloride, which is thus concentrated by this step. Thereafter, the ore is suitably dried so as to become granular and dry to the touch before it is introduced into the cold absorber. The ore material is intended to be granular throughout all of the stages.

After leaching the excess of ore metal salts from the partially solubilized ore material, or if the leaching step is omitted, the ore material is treated to chloridize the residual compounds. This may be accomplished in various ways involving the use of hydrochloric acid gas to solubilize the residual oxides and chlorine-bearing reagents, such as chlorine gas and ferric or ferrous chloride, to chloridize the residual ore metal sulfides, silicates, ferrates, ferrites etc. It is preferred to carry on this chloridizing step in accordance with the application of Mitchell, Serial No. 687,827, filed September 1, 1933. This chloridizing procedure involves developing nascent chlorine in the ore material under conditions which result in the chloridization of the refractory components, and this is preferably accomplished by employing iron chloride as the source of nascent chlorine. It is also desirable, in certain cases, to carry on the chloridizing step in the presence of an alkaline earth metal compound, such as the oxide, hydroxide, carbonate or chloride of calcium, strontium or barium, which will fix all of the available sulfate radical as an insoluble alkaline earth metal sulfate, and thus effectively prevent the replacement of chlorine by the sulfate radical and insure the production of ore metal chlorides which are free from their sulfates. To carry out this portion of the process, the ore material in its dry condition as derived from the hot absorber treatment is mixed with a suitable quantity of alkaline earth material, such as calcium oxide or calcium chloride, provided an alkaline earth material was not employed in the roasting operation in quantity sufficient for the chloridizing steps. This calculation may be such as to provide the alkaline earth metal in an amount which is the molecular equivalent of the sulfate radical found to be available in the chloridizing stages for reaction therewith.

Since the average sulfide ore contains iron sulfide in sufficient quantity for the purpose, and this material has been roasted preferably to ferric oxide, the next step involves the conversion of this ferric oxide to the chloride. If iron is not present in sufficient amount, then, of course, suitable material will be added for the purpose. To obtain a sufficient amount of iron chloride, which has not been formed in the hot absorber in the preferred treatment of a zinc ore, the ore material is now passed into an apparatus known as the cold absorber and there treated with strong hydrochloric acid gas and preferably in the absence of any large amount of air. In this apparatus, the ferric oxide reacts with the hydrochloric acid gas to form ferric chloride and water. A large amount of the water of reaction is taken up by the ferric chloride as water of crystallization, hence the material does not become wet to the touch but remains granular in character. The temperature of this cold absorber is kept below about 90° C. to 100° C., or at a temperature at which the iron chloride crystals will not melt or dissociate. If the crystals melted during the period of gas introduction, the penetration of the gas would be seriously hindered. The iron chloride and the ore in general must remain dry to the touch, although some moisture may be present. The excess of hydrochloric acid gas not used in this cold absorber may be conducted to the hot absorber, as above explained; but it is to be observed that the moisture-laden gases from the finisher will not be conducted to this cold absorber but will be by-passed around it. Hence, water from neither the hot absorber nor the finisher can condense on this cold ore material. It will be appreciated that the excess of zinc oxide which has not been treated in the hot absorber will be converted by the hydrochloric acid gas to zinc chloride in this cold absorber. It is, therefore, important that this control of the moisture content in the cold absorber be maintained so as to prevent the deliquescent zinc chloride from forming a syrupy mass. The cold absorber may be jacketed and cooled with a suitable fluid, as desired. The hydrochloric acid gas may pass in a concurrent or a countercurrent flow over the ore material; and various procedures may be adopted to expedite or improve the reactions in this zone.

The final stage of chloridization is carried on in the finisher, in which the ore descends in counterflow relationship to heat, which gradually heats the material to a temperature at which the iron chlorides are not stable, and which is preferably between 250° and 350° C., and below the point at which a desired ore metal chloride volatilizes or forms objectionable compounds. Air in excess is admitted at the lower end of the finisher, and the direct reaction of the air on the iron chlorides results in the evolution of nascent chlorine, which is a powerful reagent for chloridizing the residual sulfides, silicates and iron compounds which may be present. At the upper end of the finisher, the iron chloride crystals melt and dissolve in their water of crystallization and so get into very intimate contact with the ore particles and presumably react directly therewith to a certain extent at the low temperature of the upper inlet end of this apparatus. It is to be observed in particular that the water thus present in the ore material is driven off as the material is heated to a point above 100° C., but this water is not allowed to remain in contact with the ore material. It is removed from the inlet end of the apparatus, as indicated, and it is passed directly to the hot absorber and around the cold absorber. Consequently, the amount of moisture in this finisher is so low that the formation of hydrochloric acid by reaction of the water with the iron chloride does not take place to any large extent, and the major portion of the chlorine of the ferric or ferrous chloride is necessarily evolved as nascent chlorine and not as the weaker reagent, hydrochloric acid. The finisher may be heated by any suitable source of heat, but it is preferred that the apparatus be jacketed and that hot gas be passed in a counterflow direction from the outlet to the inlet end of the finisher, and then be by-passed to the hot absorber, as above explained. In this way, the ore has been kept in a substantially dry and granular condition throughout the entire process, except during leaching, and the ore metal values have been effectively and efficiently converted to chlorides during the final stages. Also, any silicic acid formed in the cold absorber is dehydrated in the finisher at the temperature maintained therein, so that the solutions of salts leached from the finisher product are free from silicic acid. Thereafter, it is a simple matter to separate the values in accordance with well-known practice. For example, the zinc chloride may be leached from the finisher product by means of water, and any lead chloride or lead sulfate present will be leached from the residue by means of a hot sodium chloride solution. The residue contains the ferric oxide, calcium sulfate and gangue.

It will be appreciated that the hot absorber stage of the process results in the production of a zinc salt which is not only substantially free from iron and silicic acid but it is not contaminated with soda salts, as are found in the product of a salt roasting operation where the raw sulfide ore is roasted at a high temperature with sodium chloride. The hot absorber treatment followed by leaching with water makes it unnecessary to carry through all of the chloridizing stages that excess of zinc or other salts which are not later needed, thus not only providing an economical method of ore treatment but in particular preparing the ore residue for a later efficient chloridizing operation. The initial hot absorber step uses the waste gases and the less expensive hydrochloric acid to convert the oxides to the chlorides, and leaves to the more expensive but powerful reagent, chlorine, the task of attacking the residual sulfides and other refractory compounds. These chloridizable compounds have thus been exposed and partly prepared for attack by the chlorine, because of the removal of other values and a consequent opening up of the ore particle. In particular, the major portion of the deliquescent zinc chloride has been removed, so that it cannot close the pores to the chlorine. Due to the fine settling qualities of the heat treated material, a small Dorr equipment may be made to handle a large tonnage of ore. It is immaterial how much acid-soluble silicates are present in the original ore, since these are taken care of automatically, and silicic acid cannot be present at any stage where it might have a detrimental effect.

This case is a continuation in part of my prior application Serial No. 606,282 filed April 19, 1932.

Having thus described the invention, what is claimed as new and desired to secure by Letters Patent is:

1. The method of chloridizing an ore material containing an ore metal oxide and an acid-soluble silicate comprising the steps of converting an ore metal oxide to a soluble salt by a direct low-temperature reaction of the ore material in a substantially dry, granular condition with an acid reagent which also converts said silicate to silicic acid, then heating the treated ore material to dehydrate the silicic acid and leave the ore material in a granular, gas-permeable condition, and thereafter chloridizing the partially treated, dry residue by means of a gaseous reagent containing the chlorine atom and at a low temperature at which silicic acid would resist penetration of the reagent gas into the ore material.

2. The method of chloridizing an ore material containing an acid decomposable siliceous gangue, a refractory ore metal compound and the oxide of a metal, comprising the steps of treating the ore material in a granular condition with an acid reagent capable of forming a sulfate or chloride of said metal together with silicic acid, and then, prior to any step of leaching or solubilizing further ore metal values, heating the partially treated ore material to dehydrate the silicic acid, and thereafter converting a residual refractory ore metal compound to a soluble chloride by treatment of the material in a granular condition with a reagent containing the chlorine atom, while maintaining a temperature at which silicic acid would be stable, and finally leaching out the soluble ore metal values, whereby the final solubilizing and leaching steps are not hindered by the silicic acid initially formed.

3. The method of claim 1 in which the soluble salts are leached from the ore material after the silicic acid has been dehydrated, whereby a subsequent leaching operation is not hindered or the salt solution contaminated by the presence of the silicic acid and the content of values in the ore material is materially reduced prior to said chloridizing step.

4. The method of chloridizing an oxidized granular ore material containing the oxide and another refractory compound of an ore metal together with an acid-decomposable, siliceous gangue comprising the steps of treating said material with an acid reagent which solubilizes ore metal oxide and produces an ore material containing silicic acid and an ore metal salt, heating the ore material to dehydrate the silicic acid and leave the material in a granular condition, leaching from the ore material the soluble ore metal salt therein, thereafter chloridizing the refractory ore metal compound and residual oxide by treating the ore material in a substantially dry condition with a gaseous reagent containing the chlorine atom, and ultimately dissolving the solubilized ore metal compounds from the ore material, whereby silicic acid is prevented from materially interfering with the chloridizing and leaching steps.

5. The method of chloridizing a sulfide ore containing an acid-soluble silicate comprising the steps of roasting it with air to form an ore metal oxide, treating the roasted material in a substantially dry condition with a gaseous acid reagent to convert said oxide to a chloride or sulfate, which also produces silicic acid, heating the treated material to dehydrate the silicic acid, leaching the soluble ore metal salt from the ore material without hindrance from the silicic acid or the contamination of the solution thereby, drying the ore residue to a granular condition and thereafter treating it in a substantially dry condition with a chloridizing gas which penetrates the partially treated ore granules and converts residual values to the chloride form.

6. The method of chloridizing a sulfide ore containing iron and a high content of zinc, comprising the steps of claim 5 in which the iron sulfide is roasted to ferric oxide and only the readily soluble portion of the zinc oxide of the roasted ore is converted to a soluble salt by the gaseous acid reagent, but sufficient zinc oxide is left to prevent the ferric oxide from being solubilized, so that a zinc salt substantially free from iron is recovered by the leaching operation and a low zinc ore residue is provided for the subsequent chloridization.

7. The method of claim 5 in which the waste chloridizing gases from the last stage and containing hydrochloric acid gas are employed in an initial stage to convert part of the ore metal oxide to a chloride which is removed from the ore material by the leaching operation.

8. In the chloridization of a roasted sulfide ore containing an ore metal oxide and an acid-soluble silicate first by hydrochloric acid gas and then by chlorine, the steps of heating the ore material, after treatment with the hydrochloric acid gas but prior to treatment with the chlorine, to a temperature at which any silicic acid thus formed is dehydrated, then leaching the soluble ore metal salts from the treated material and drying the residue to provide a substantially dry granular material which is readily permeated by the chlorine gas.

9. In the method of chloridizing a sulfide ore containing an acid-soluble silicate and the sulfides of iron and other metal comprising the steps of roasting the ore to provide oxides of the metals, treating the dry roasted material with a gaseous reagent containing hydrochloric acid to solubilize the metal oxides and form iron chloride and thereafter heating the material with air and moisture to a temperature at which the iron chloride is not stable and forming a chloridizing gas therefrom, the steps of heating the ore material after it has been treated with the acid so as to dehydrate any silicic acid formed therein, leaching the soluble salts therefrom and providing a solution which is free from silicic acid and then drying the residue to provide a granular material which is permeable to the chloridizing gases developed therein, after which the residue is chloridized by means of said iron chloride.

10. The method of chloridizing a sulfide ore containing compounds of iron and another ore metal together with an acid-soluble silicate comprising the steps of roasting the ore material to form ferric oxide, treating the ore in a substantially dry condition with an acid reagent which is capable of converting an ore metal oxide to a sulfate or chloride and preventing the formation of a soluble iron salt, then heating the ore material to dehydrate any silicic acid formed by the acid treatment, leaching the soluble ore metal salts from the ore material and thus obtaining a solution which is substantially free from iron and silicic acid, drying the ore material, treating it with a chloridizing agent to form iron chloride therein and further chloridizing ore metal compounds within the ore material, and thereafter leaching soluble or metal salts from the ore.

11. The method of chloridizing an ore containing an acid-soluble silicate and zinc and iron sulfides comprising the steps of roasting the ore to form zinc and ferric oxides, treating the roasted material in a substantially dry, granular condition and at a low temperature with hydrochloric acid gas to form zinc chloride together with silicic acid, while maintaining the iron as ferric oxide, heating the treated material to dehydrate the silicic acid, leaching out the soluble salts and producing a solution which is substantially free from silicic acid and iron chloride, drying the residue to a granular condition and thereafter chloridizing the residual ore metal compounds.

12. The method of claim 11 in which the ferric oxide in the ore is chloridized by hydrochloric acid gas subsequent to the leaching operation and the ore is thereafter heated with oxygen to a temperature at which iron chloride is not stable and a chloridizing gas is formed in the presence of the ore material, and the waste gases derived from these chloridizing steps are employed preliminarily to form the zinc chloride.

13. The method of treating a zinc sulfide ore which is high in acid-soluble silicates comprising the steps of roasting the ore with air under conditions which produce a granular, gas-permeable material, treating the ore material in a substantially dry condition and at a low temperature with a reagent of the group consisting of hydrochloric acid and sulfuric acid and forming a soluble zinc salt and silicic acid, raising the temperature to a point below the volatilization and decomposition points of the zinc salt to dehydrate any silicic acid therein, leaching zinc salt from the ore material and leaving the residue in a granular condition capable of being readily penetrated by further gaseous reagents and thereafter treating the ore material with gaseous reagents and chloridizing residual zinc compounds therein.

14. The method of treating a sulfide ore which is high in zinc and acid-soluble silicates comprising the steps of roasting the ore under low temperature conditions to produce a non-sintered, granular material containing zinc oxide, treating this material in a substantially dry condition with a chloridizing gas comprising hydrochloric acid gas to convert zinc oxide to the chloride and forming silicic acid, while removing sufficient water of reaction and maintaining such temperature and chloridizing conditions that the ore material remains in a substantially dry, granular condition, thereby preventing the deliquescent zinc chloride from dissolving in the water of reaction to such an extent as to materially hinder the penetration of reagent gases to the ore material, heating the material to a point at which silicic acid is not stable to dehydrate the same, thereafter leaching zinc chloride from the ore material as a solution which is substantially free from silicic acid and leaving the ore material in a granular, gas-permeable condition which is low in zinc and subsequently chloridizing the residual zinc compounds therein.

15. The method of treating a sulfide ore containing zinc and iron sulfides and which is high in acid-soluble silicates comprising the steps of roasting the ore with air and producing a granular material containing zinc and ferric oxides, treating this roasted material in a substantially dry, granular condition with a reagent of the group consisting of hydrochloric acid and sulfuric acid and forming a soluble zinc salt and silicic acid, while limiting the supply of reagent acid so as to leave sufficient zinc oxide in the ore material to substantially prevent the solubilization of the ferric oxide, raising the temperature to a point below the volatilization and decomposition points of the zinc salt in order to dehydrate any silicic acid therein, thereafter leaching the ore material to remove the zinc salt therefrom as a solution which is substantially free from iron and leaving the ferric oxide with the residue, and subsequently chloridizing the residual zinc compounds in the ore material.

16. The method of treating a sulfide ore containing zinc and iron sulfides and which is high in zinc and acid-soluble silicates comprising the steps of roasting the ore with air and producing a granular material containing zinc and ferric oxides, treating the granular material with a chloridizing gas containing hydrochloric acid which forms silicic acid and zinc chloride from the ore material, while passing the gas through the reaction chamber at such a rate and under such temperature conditions adjacent to 100° C. that the material remains in a substantially dry, granular condition which is readily penetrated by the gas, while limiting the supply of gas and the chloridization treatment so that sufficient zinc oxide will be left to substantially prevent the chloridization of the ferric oxide, and finally raising the temperature to a point at which any silicic acid present is not stable so as to dehydrate the same, thereafter leaching the ore material to remove zinc chloride therefrom and leave the ore material containing ferric oxide in a granular condition for a subsequent treatment to recover further ore values therefrom, and thereafter converting the ferric oxide to a chloride in the presence of the residual refractory zinc compounds and chloridizing the same.

17. The method of treating a complex ore material containing the oxides of zinc or manganese and a large amount of acid-soluble silicates comprising the steps of treating the material in a substantially dry condition with a gaseous reagent of the group consisting of hydrochloric acid and sulfuric acid and thereby forming a soluble ore metal salt together with silicic acid, then raising the temperature of the material to a point at which the silicic acid is decomposed without affecting the ore metal salt, dissolving ore metal salt from the ore material and providing a granular, gas-permeable material, and thereafter treating this material with a gaseous chloridizing agent to convert residual ore metal compounds to the chloride form.

18. The method of chloridizing a sulfide ore containing an acid soluble silicate comprising the steps of roasting the ore with air to form an ore metal oxide, treating the roasted material in a substantially dry condition with an acid reagent which is capable of forming a chloride or sulfate from an ore metal oxide and at the same time producing silicic acid within the ore material, heating the ore material in that condition to a temperature sufficient to dehydrate the silicic acid and form a granular, permeable material, thereafter treating the ore material in intermixture with iron oxide and at a temperature below that at which the silicic acid would be stable, if present, with a chloridizing agent which serves to form iron chloride therein, and subsequently heating the ore material with air to a temperature at which the iron chloride is decomposed, with the formation of a gaseous chloridizing agent, and thereafter leaching soluble salts from the ore material, whereby the silicic acid does not interfere with the low temperature chloridizing and leaching steps.

19. The method of chloridizing a complex ore containing zinc and iron sulfides together with an acid decomposable siliceous gangue comprising the steps of roasting the ore with air to form ore metal oxides, treating the roasted material with an acid reagent which solubilizes an ore metal oxide and forms silicic acid, while preventing iron oxide from being converted to a soluble salt, heating the ore material to dehydrate the silicic acid, leaching the soluble ore metal salt from the ore material and providing a solution thereof which is substantially free from iron and silicic acid, thereafter converting iron oxide within the ore material to a cholride and subsequently heating the ore material with air to a temperature at which the iron chloride is not stable and developing therefrom a chloridizing gaseous reagent which serves in the chloridization of the ore.

20. The method of chloridizing an ore material containing the oxides of iron and zinc together with an acid-soluble siliceous gangue comprising the steps of treating the ore material in a substantially dry and granular condition and at a low temperature with an acid reagent of the group consisting of sulfuric and hydrochloric acids and thereby forming silicic acid from the gangue and converting to a salt only that portion of the zinc oxide which is readily acid soluble and without producing a soluble iron salt, then heating the treated material to dehydrate the silicic acid and leave the material in a granular condition, thereafter converting the iron oxide to a chloride in situ and causing the iron chloride to chloridize further ore values, and ultimately leaching a desired soluble compound from the ore material, whereby the initial formation of silicic acid cannot hinder the subsequent chloridizing and leaching operations.

21. The method of chloridizing an ore material which is high in zinc oxide and contains ferric oxide comprising the steps of claim 20 in which sufficient zinc oxide is left initially in the ore material so as to prevent the ferric oxide from being converted to a soluble salt, and the ore is leached after the dehydration of the silicic acid so as to provide an aqueous solution of a zinc salt which is substantially free from iron and silicic acid and to leave on ore residue which is low in zinc, after which the ore material is treated to chloridize the remainder of the zinc content.

ROYAL L. SESSIONS.